US012762496B2

(12) United States Patent
Tanaka et al.

(10) Patent No.: US 12,762,496 B2
(45) Date of Patent: Oct. 13, 2026

(54) SYSTEM AND METHOD FOR SOFTWARE PATH TRACING AND TESTING FOR MICROSERVICES

(71) Applicant: Hitachi, Ltd., Tokyo (JP)

(72) Inventors: Akira Tanaka, Tokyo (JP); Takashi Tameshige, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 100 days.

(21) Appl. No.: 18/829,902

(22) Filed: Sep. 10, 2024

(65) Prior Publication Data

US 2025/0190914 A1 Jun. 12, 2025

(30) Foreign Application Priority Data

Dec. 12, 2023 (JP) ................................. 2023-209670

(51) Int. Cl.
*G06Q 10/0637* (2023.01)
*G06Q 10/0631* (2023.01)
*G06Q 10/087* (2023.01)

(52) U.S. Cl.
CPC . *G06Q 10/06375* (2013.01); *G06Q 10/06315* (2013.01); *G06Q 10/087* (2013.01)

(58) Field of Classification Search
CPC ............. G06Q 10/0637; G06Q 10/087; G06Q 10/0631; G06F 11/3636; G06F 11/3692; G06F 11/3604; G06F 11/3672; G06F 11/362; G06F 11/3698; G06F 11/3612; G06F 11/3466; G06F 11/323; G06F 11/3684
See application file for complete search history.

(56) References Cited

U.S. PATENT DOCUMENTS 6,615,371 B2 * 9/2003 McCullough ....... G06F 11/3648 714/E11.212
6,959,431 B1 * 10/2005 Shiels ................. G06F 11/3696 717/124

(Continued)

FOREIGN PATENT DOCUMENTS

JP 2020-160567 A 10/2020

OTHER PUBLICATIONS

Dinwoodie, Ian R. 2023. Execution Path Tracing as the Basis for Platform-Agnostic Performance Tests. Master's thesis, Harvard University Division of Continuing Education (Year: 2023).*

(Continued)

*Primary Examiner* — Scott L Jarrett
(74) *Attorney, Agent, or Firm* — Volpe Koenig

(57) ABSTRACT

An object is to more correctly specify, when an abnormality occurs in a request path including a microservice, a business impacted by the abnormality of the request path. A trace data shaping unit is provided, which determines whether a redundant request path exists in a request path during a normal operation, and creates, when the redundant request path exists, trace data excluding the redundant request path. When it is determined that an abnormality occurs in any request path, a business impact range analysis unit refers to use case association information based on any request path excluding the redundant request path and specifies a content of a business impacted by the request path where the abnormality occurs among contents of businesses.

8 Claims, 12 Drawing Sheets

(56) References Cited

U.S. PATENT DOCUMENTS

| | | | | |
|---|---|---|---|---|
| 7,793,267 | B2 * | 9/2010 | Davison | G06F 11/3616 717/124 |
| 8,141,051 | B2 * | 3/2012 | Huang | G06F 11/3409 717/127 |
| 8,943,370 | B2 * | 1/2015 | Burghard | G06F 11/0721 714/45 |
| 9,223,681 | B2 * | 12/2015 | Delporte | G06F 11/3604 |
| 9,367,427 | B2 * | 6/2016 | Andre | G06F 11/3698 |
| 9,471,465 | B2 * | 10/2016 | Burghard | G06F 11/3636 |
| 9,740,594 | B2 * | 8/2017 | Delporte | G06F 11/0778 |
| 9,946,628 | B2 * | 4/2018 | Andre | G06F 11/3636 |
| 10,073,767 | B2 * | 9/2018 | Gadiya | G06F 11/3636 |
| 10,169,220 | B2 * | 1/2019 | Rajagopalan | G06F 11/3688 |
| 10,379,996 | B2 * | 8/2019 | Gupta | G06F 11/3476 |
| 10,423,520 | B2 * | 9/2019 | Gupta | G06F 11/3692 |
| 10,657,031 | B2 * | 5/2020 | Hoermann | G06F 11/3612 |
| 10,831,649 | B2 * | 11/2020 | Gadiya | G06F 11/323 |
| 11,093,378 | B2 * | 8/2021 | Balasubramanian | G06F 11/3495 |
| 11,256,590 | B1 * | 2/2022 | Hulick, Jr. | G06Q 10/06 |
| 11,349,909 | B2 * | 5/2022 | Hulick, Jr. | H04L 67/34 |
| 11,573,886 | B2 * | 2/2023 | Cheng | G06F 11/3684 |
| 11,675,584 | B1 * | 6/2023 | Sengupta | G06F 8/75 717/124 |
| 12,450,116 | B2 * | 10/2025 | Feng | G06F 11/0715 |
| 2005/0137839 | A1 * | 6/2005 | Mansurov | G06F 8/10 703/13 |
| 2006/0259320 | A1 * | 11/2006 | LaSalle | G06Q 10/101 705/35 |
| 2008/0092123 | A1 * | 4/2008 | Davison | G06F 11/3636 717/128 |
| 2008/0172580 | A1 * | 7/2008 | Davia | G06F 11/3676 714/38.14 |
| 2008/0222501 | A1 * | 9/2008 | Travison | G06F 11/366 714/E11.207 |
| 2011/0283260 | A1 * | 11/2011 | Bucuvalas | G06F 11/3698 717/124 |
| 2012/0124428 | A1 * | 5/2012 | Zeng | G06F 11/3692 714/45 |
| 2012/0192162 | A1 * | 7/2012 | Li | G06F 11/3604 717/146 |
| 2013/0346806 | A1 * | 12/2013 | Burghard | G06F 11/0721 714/45 |
| 2014/0173358 | A1 * | 6/2014 | Burghard | G06F 11/0706 714/45 |
| 2014/0237454 | A1 * | 8/2014 | Delporte | G06F 11/366 717/127 |
| 2014/0282428 | A1 * | 9/2014 | Andre | G06F 11/3698 717/128 |
| 2015/0058826 | A1 * | 2/2015 | Hu | G06F 11/3698 717/128 |
| 2016/0103750 | A1 * | 4/2016 | Cooper | G06F 11/3495 719/328 |
| 2016/0239400 | A1 * | 8/2016 | Andre | G06F 11/3636 |
| 2016/0378615 | A1 * | 12/2016 | Cohen | G06F 11/00 714/19 |
| 2018/0039570 | A1 * | 2/2018 | Rajagopalan | G06F 11/3636 |
| 2018/0203795 | A1 * | 7/2018 | Gadiya | G06F 11/3612 |
| 2018/0239688 | A1 * | 8/2018 | Gupta | G06F 11/3684 |
| 2020/0204461 | A1 * | 6/2020 | Fang | H04L 43/55 |
| 2020/0257680 | A1 * | 8/2020 | Danyi | G06F 11/3495 |
| 2020/0409822 | A1 * | 12/2020 | Balasubramanian | G06F 11/3419 |
| 2022/0027249 | A1 * | 1/2022 | Dua | G06F 11/3466 |
| 2022/0027257 | A1 * | 1/2022 | Harutyunyan | G06F 11/3452 |
| 2022/0086075 | A1 * | 3/2022 | Nee | H04L 43/0888 |
| 2022/0166840 | A1 | 5/2022 | Ikeda et al. | |
| 2022/0172037 | A1 * | 6/2022 | Kang | G06N 3/0442 |
| 2023/0305951 | A1 * | 9/2023 | Douglas | G06F 8/60 |
| 2024/0296408 | A1 * | 9/2024 | Hu | G06Q 10/06375 |
| 2025/0028629 | A1 * | 1/2025 | Agrawal | G06F 11/3684 |

OTHER PUBLICATIONS

Myers, Glenford J. et al., The Art of Software Testing—3rd Edition John Wiley & Sons, Inc., 2012 (Year: 2012).*

Rooney, Thomas, Automated Test Generation through Runtime Execution Trace Analysis Imperial College London, 2015 (Year: 2015).*

Krikava, Filip et al., Tests from Traces: Automated Unit Test Extraction for R ISSTA 2018: Proceedings of the 27th ACM SIGSOFT International Symposium on Software Testing and Analysis (Jul. 2018) (Year: 2018).*

* cited by examiner

FIG. 4

131

TEST CASE INFORMATION

| TEST CASE ID (131A) | TEST CASE NAME (131B) | RELATED USE CASE ID (131C) | RELATED USE CASE NAME (131D) | TEST CONTENT (131E) |
| --- | --- | --- | --- | --- |
| TC-1 | CHECKOUT OF REGISTERED USER | UC-1 | ORDER SETTLEMENT OF REGISTERED USER | ADD PLURALITY OF ITEMS TO CART. CHECK WHETHER ADDITION IS SUCCESSFUL. |
| TC-2 | ORDER CREATION OF REGISTERED USER | UC-1 | ORDER SETTLEMENT OF REGISTERED USER | PRESS ORDER CREATION BUTTON. CHECK WHETHER CORRECT PRICE IS GENERATED. |
| TC-3 | PAYMENT OF REGISTERED USER | UC-1 | ORDER SETTLEMENT OF REGISTERED USER | PRESS PAYMENT BUTTON, INPUT CREDIT CARD INFORMATION, AND PAY. CHECK PAYMENT RESULT. |
| … | … | | … | … |

FIG. 5

132

TEST RECORD INFORMATION

| TEST CASE ID (132A) | URI (132B) | PARAMETER (132C) | METHOD (132D) | REQUEST BODY (132E) | STATUS CODE (132F) | RESPONSE BODY (132G) | START TIME (132H) | END TIME (132I) | Trace ID (132J) | Span ID (132K) | Parent ID (132L) |
|---|---|---|---|---|---|---|---|---|---|---|---|
| TC-1 | /userCheckout | productID= ESPC7Z | GET | | 200 | {"result":"0" } | 2022-11-04 01:42:08. 5653016 +0000 UTC | 2022-11- 04 01:42:09. 1837765 +0000 UTC | e8bdc860 | 8b8d57f6 | |
| TC-2 | /createOrder | | POST | { "product ID":"ESPC7 Z", "userID":" 2zyfj3"} | 200 | {"orderID":" 6a25pa1"} | 2022-11-04 01:42:18. 1474245 +0000 UTC | 2022-11- 04 01:42:19. 0588737 +0000 UTC | 55c94b0d | 91b8a50e | |
| TC-2 | /calculatePrice | | POST | {"orderID" :" 6a25pa1", "productI D":" ESPC7Z"} | 200 | {"price":"18 000"} | 2022-11-04 01:42:21. 3199481+00 00 UTC | 2022-11- 04 01:42:22. 1535358 +0000 UTC | 55c94b0d | 2359cab3 | 91b8a50e |
| TC-2 | /inventoryCheck | productID= ESPC7Z | GET | | 200 | {"result":"0" } | 2022-11-04 01:42:22. 8294422+00 00 UTC | 2022-11- 04 01:42:23. 7322919 +0000 UTC | 55c94b0d | 868ee8bd | 91b8a50e |
| TC-2 | /getdiscount | productID= ESPC7Z | GET | | 200 | {"amount":" 1000"} | 2022-11-04 01:42:24. 3469521+00 00 UTC | 2022-11- 04 01:42:24. 3605612 +0000 UTC | 55c94b0d | 8571a9fc045 | 2359cab3 |
| ... | ... | ... | ... | ... | ... | ... | ... | ... | ... | ... | ... |

FIG. 6

133

USE CASE ASSOCIATION INFORMATION

| USE CASE ID (133A) | API REQUEST PATH (133B) | REQUEST CONTENT (133C) |
| --- | --- | --- |
| UC-1 | {"service":"checkout",<br>"url":"/userCheckout",<br>"method":"GET",<br>"nextcall":""<br>} | {"parameter":" productID=" ,<br>"payload"=""} |
| UC-1 | {<br>"service": "order",<br>"url": "/createOrder",<br>"method": "POST",<br>"nextcall": [<br>{<br>"service": "calculate",<br>"url": "/calculatePrice",<br>"method": "POST",<br>"nextcall": {<br>"service": "Discount",<br>"url": "/getDiscount",<br>"method": "GET",<br>"nextcall": ""<br>}<br>},<br>{<br>"service": "inventory",<br>"url": "/inventoryCheck",<br>"method": "GET",<br>"nextcall": ""<br>}<br>]<br>} | {"parameter":"",<br>"payload":["productID",<br>"userID"]} |
| … | … | … |

FIG. 7

134

TARGET VALUE INFORMATION OF MONITORING ITEM 134A 134B 134C 134D 134E 134F

| TARGET VALUE ID | API ENDPOINT | MICROSERVICE | MEASUREMENT PERIOD | THRESHOLD | PERCENTAGE TARGET |
|---|---|---|---|---|---|
| SLO-1 | /userCheckout | Checkout | ONE MONTH | 500 ms | 99% |
| SLO-2 | /createOrder | Order | ONE MONTH | 1000 ms | 99.9% |
| SLO-3 | /calculatePrice | Calculate | ONE MONTH | 500 ms | 99.9% |
| ... | ... | ... | ... | ... | ... |

FIG. 8

135

TRACE DATA

| URI (135A) | PARAMETER (135B) | METHOD (135C) | REQUEST BODY (135D) | STATUS CODE (135E) | RESPONSE BODY (135F) | START TIME (135G) | END TIME (135H) | Trace ID (135I) | Span ID (135J) | Parent ID (135K) |
|---|---|---|---|---|---|---|---|---|---|---|
| /userCheckout | productID =ESPC7Z | GET | | 200 | {"result":"0" } | 2022-11-07 01:30:08. 3226328 +0000 UTC | 2022-11-07 01:30:08. 8826696 +0000 UTC | 4kzkn1y | aj07npa | |
| /createOrder | | POST | { "productI D":"ESPC7Z ", "userID":"2 zyfj3"} | 200 | {"orderID":" 6a25pa1"} | 2022-11-07 01:31:18. 66908465 +0000 UTC | 2022-11-07 01:31:19. 3087481 +0000 UTC | ythy6f0 | dv4cuf2 | |
| /calculatePrice | | POST | {"orderID":" 6a25pa1", "productID" :" ESPC7Z"} | 200 | {"price":"18 000"} | 2022-11-07 01:31:19. 1734098 +0000 UTC | 2022-11-07 01:31:19. 8768453 +0000 UTC | ythy6f0 | 5wb14d5 | dv4cuf2 |
| /inventoryCheck | productID =ESPC7Z | GET | | 400 | {"result":"- 1"} | 2022-11-07 01:31:20. 1217169 +0000 UTC | 2022-11-07 01:31:20. 1316991 +0000 UTC | ythy6f0 | 4jb2tnu | dv4cuf2 |
| /inventoryCheck | productID =ESPC7Z | GET | | 200 | {"result":"0" } | 2022-11-07 01:31:20. 1327690 +0000 UTC | 2022-11-07 01:31:20. 3169916 +0000 UTC | ythy6f0 | tnu4jb2 | dv4cuf2 |
| /getdiscount | productID =ESPC7Z | GET | | 200 | {"amount":" 1000"} | 2022-11-07 01:31:21. 8452450 +0000 UTC | 2022-11-07 01:31:21. 9058335 +0000 UTC | ythy6f0 | z9b0n3n | 5wb14d5 |
| ... | ... | ... | ... | ... | ... | ... | ... | ... | ... | ... |

SYSTEM AND METHOD FOR SOFTWARE PATH TRACING AND TESTING FOR MICROSERVICES

BACKGROUND OF THE INVENTION

1. Field of the Invention

The present invention relates to a business impact range presentation apparatus and a business impact range presentation method, and is suitable, for example, for application to a business impact range presentation apparatus related to a technique for presenting a range of an impact on a business.

2. Description of Related Art

In recent years, with proliferation of microservices, system monitoring has become complex. Since stakeholders seek materials for business decisions, an operation manager needs to routinely perform operation management in consideration of a relationship between an operation target and a business. For this purpose, a technique for specifying a relationship between a system and a business based on a behavior of the system is required.

In order to introduce an operation support method for supporting such operation management, it is necessary for the operation manager to define the relationship between the business and the system in advance, and it is assumed that the relationship is understood. Therefore, the operation manager needs to prepare for an appropriate operation of the system in cooperation with a developer. By introducing such an operation support method, the operation manager can constantly check the relationship between the business and the system.

PTL 1 discloses an operation support method of retaining association information between an information technology (IT) system and a business, retaining information on a system important for the business, a recovery level and a recovery procedure for continuity of the business, and thus enabling appropriate selection of a countermeasure when an incident occurs. According to the method disclosed in PTL 1, by retaining a business function constituting a business support system, a business target recovery level, an accomplishment determination criterion, and an implementation item in association with one another, it is possible to present a countermeasure for accomplishing the target recovery level at the time of a failure of the business support system.

CITATION LIST

Patent Literature

PTL 1: JP2020-160567A

SUMMARY OF THE INVENTION

However, in the operation support method disclosed in PTL 1, the operation support method is searched for from association information between a business content and the business function constituting the business support system, which are already grasped. For this reason, when the operation support method disclosed in PTL 1 is applied to a microservice, there is a possibility that, when an abnormality such as performance degradation or a failure occurs in a request path including the microservice or an application programming interface (API), the following issue occurs. That is, in the operation support method disclosed in PTL 1, since the operation support method is searched for from the association information between the business content and the business function that are already grasped, the operation support method cannot be searched for in consideration of the abnormality, and it is difficult to specify a content of a business impacted by the abnormality from the request path.

The invention has been made in view of the above points, and has proposed a business impact range presentation apparatus and a business impact range presentation method that can more correctly specify, when an abnormality occurs in a request path including a microservice in a production environment, a content of a business impacted by the abnormality of the request path.

In order to solve the above problems, the invention related to: a test log collection unit configured to collect test record information indicating an execution result of a test on monitored software in which one or more operation steps each indicating a component of each content of a plurality of businesses and a plurality of microservices that execute processing by an operation of the one or more operation steps are connected via one or more request paths, and to collect test case information indicating a relationship between the content of each of the businesses and each of the operation steps; a use case association unit configured to generate use case association information by associating, based on the test record information and the test case information collected by the test log collection unit, a request path corresponding to each of the operation steps among the one or more request paths with the content of each of the businesses; a monitoring information acquisition unit configured to acquire trace data indicating an execution result of each of the microservices as an execution result in a production environment for the monitored software; a trace data shaping unit configured to determine whether a redundant request path exists among the request paths during a normal operation, and to create, when the redundant request path exists, the trace data excluding the redundant request path; and a business impact range analysis unit configured to determine, based on the trace data acquired by the monitoring information acquisition unit, whether an abnormality occurs in any request path among the one or more request paths, in which, when it is determined that the abnormality occurs in the any request path, the business impact range analysis unit refers to the use case association information based on the any request path excluding the redundant request path, and specifies a content of a business impacted by the request path where the abnormality occurs among the content of each of the businesses.

The invention also includes: a test log collection step in which a test log collection unit collects test record information indicating an execution result of a test on monitored software in which one or more operation steps each indicating a component of each content of a plurality of businesses and a plurality of microservices that execute processing by an operation of the one or more operation steps are connected via one or more request paths, and collects test case information indicating a relationship between the content of each of the businesses and each of the operation steps; a use case association step in which a use case association unit generates use case association information by associating, based on the test record information and the test case information collected in the test log collection step, a request path corresponding to each of the operation steps among the one or more request paths with the content of each of the businesses; a monitoring information acquisition step in which a monitoring information acquisition unit acquires trace data indicating an execution result of each of the microservices as an execution result in a production environment for the monitored software; a trace data shaping step in which a trace data shaping unit determines whether a redundant request path exists among the request paths during a normal operation, and creates, when the redundant request path exists, the trace data excluding the redundant request path; and a business impact range analysis step in which a business impact range analysis unit determines, based on the trace data acquired in the monitoring information acquisition step, whether an abnormality occurs in any request path among the one or more request paths, in which, in the business impact range analysis step, when it is determined that the abnormality occurs in the any request path, the business impact range analysis unit refers to the use case association information based on the any request path excluding the redundant request path, and specifies a content of a business impacted by the request path where the abnormality occurs among the content of each of the businesses.

According to the invention, when an abnormality occurs in a request path including a microservice, a content of a business impacted by the abnormality of the request path can be specified.

BRIEF DESCRIPTION OF THE DRAWINGS

FIG. 4 is a configuration diagram showing a configuration example of test case information according to the embodiment of the invention.

FIG. 5 is a configuration diagram showing a configuration example of test record information according to the embodiment of the invention.

FIG. 6 is a configuration diagram showing a configuration example of use case association information according to the embodiment of the invention.

FIG. 7 is a configuration diagram showing a configuration example of target value information of a monitoring item according to the embodiment of the invention.

FIG. 8 is a configuration diagram showing a configuration example of trace data according to the embodiment of the invention.

DESCRIPTION OF EMBODIMENTS

Figure 1:
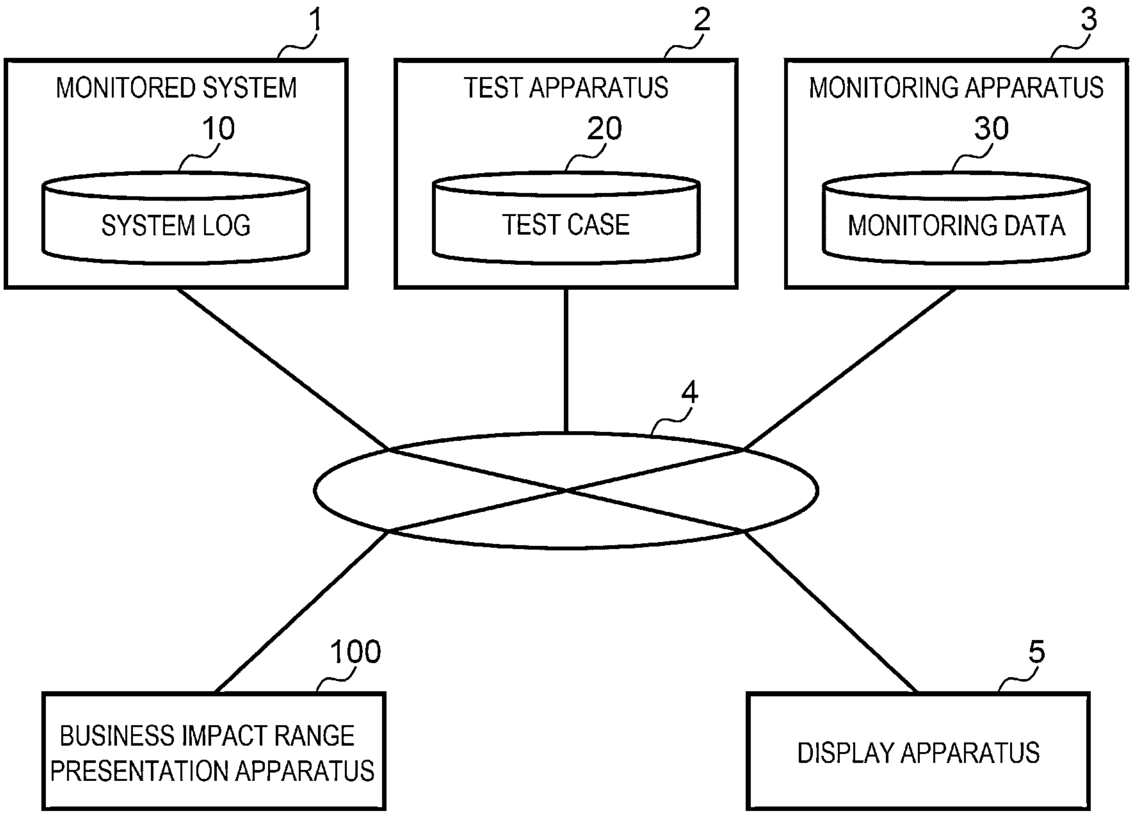
FIG. 1 is a block diagram showing a configuration example of a computer system including a business impact range presentation apparatus according to an embodiment of the invention.

Hereinafter, an embodiment according to the invention will be described with reference to the drawings. The following description and drawings are examples for showing the invention, and are appropriately omitted and simplified for clarity of the description. The invention can be implemented in various other forms. Unless otherwise specified, each component may be single or plural. In order to facilitate understanding of the invention, the position, size, shape, range, and the like of each component shown in the drawings may not represent the actual position, size, shape, range, and the like. Therefore, the invention is not necessarily limited to the positions, sizes, shapes, ranges, and the like disclosed in the drawings. In the following description, various types of information may be described by expressions such as "table" and "list", but the various types of information may be expressed by other data structures. In order to indicate that the information does not depend on the data structure, "XX table", "XX list", and the like may be referred to as "XX information". In description of identification information, when expressions such as "identification information", "identifier", "name", "ID", and "number" are used, the expressions can be replaced with one another.

(1) Embodiment

In the present embodiment, when an abnormality occurs in a request path including a microservice, a content of a business impacted by the abnormality of the request path is specified based on an execution result in a test environment and an execution result in a production environment of a monitored system that manages monitored software including a plurality of microservices that define processing contents of one or more operation steps belonging to a plurality of businesses.

FIG. 1 is a block diagram showing a configuration example of a computer system including a business impact range presentation apparatus 100 according to the embodiment of the invention. In FIG. 1, the computer system includes a monitored system 1, a test apparatus 2, a monitoring apparatus 3, a network 4, the business impact range presentation apparatus 100, and a display apparatus 5. The business impact range presentation apparatus 100 is communicably connected to the test apparatus 2, the monitoring apparatus 3, and the display apparatus 5 via the network 4. The network 4 is, for example, a public network such as the Internet, a local area network (LAN), or a wide area network (WAN).

The monitored system 1 is an IT system for executing a business, and is implemented by, for example, a computer (not shown) including a processor, a storage apparatus, an input apparatus, an output apparatus, and a communication apparatus. The processor includes, for example, a central processing unit (CPU) or a micro-processing unit (MPU). The processor executes a monitored program for executing processing corresponding to a content (hereinafter, also referred to as a use case) of the business of the IT system in a production environment. At this time, in a database 10 belonging to the storage apparatus, data such as an access log and an error log generated by the processor during execution of the monitored program is stored as a system log. A method for storing the system log is not limited.

The test apparatus 2 is an apparatus that checks whether the monitored system 1 operates normally in a test environment before being deployed in the production environment, and is implemented by, for example, a computer (not shown) including a processor, a storage apparatus, an input apparatus, an output apparatus, and a communication apparatus. In a database 20 belonging to the storage apparatus of the test apparatus 2, for example, information (test record information) indicating a test result when the monitored system 1 executes the monitored program in the test environment is stored as a test log. The test log is, for example, information for checking whether a specific use case can be normally implemented, and is used as information indicating what operation is performed and whether an expected processing result or the like is obtained therefrom. A method for storing the test log is not limited.

The monitoring apparatus 3 is an apparatus that collects various types of monitoring data from the monitored system 1 in the test environment and the production environment in order to check whether the monitored system 1 operates normally, and is implemented by, for example, a computer (not shown) including a processor, a storage apparatus, an input apparatus, an output apparatus, and a communication apparatus. A database 30 belonging to the storage apparatus of the monitoring apparatus 3 stores, as the monitoring data, for example, metrics data such as CPU usage and memory usage, trace data including a request path of an application programming interface (API) (hereinafter referred to as an "API request path"), and a data log such as an access log or an error log. The API request path is, for example, a path indicating in what order APIs operate. A method for storing the monitoring data is not limited.

The display apparatus 5 is, for example, an apparatus belonging to a server computer that is physical computer hardware owned by an operation management department of the IT system. The display apparatus 5 has a function of displaying information output from the business impact range presentation apparatus 100 via the network 4 and a visualization chart attached to the information.

Figure 2:
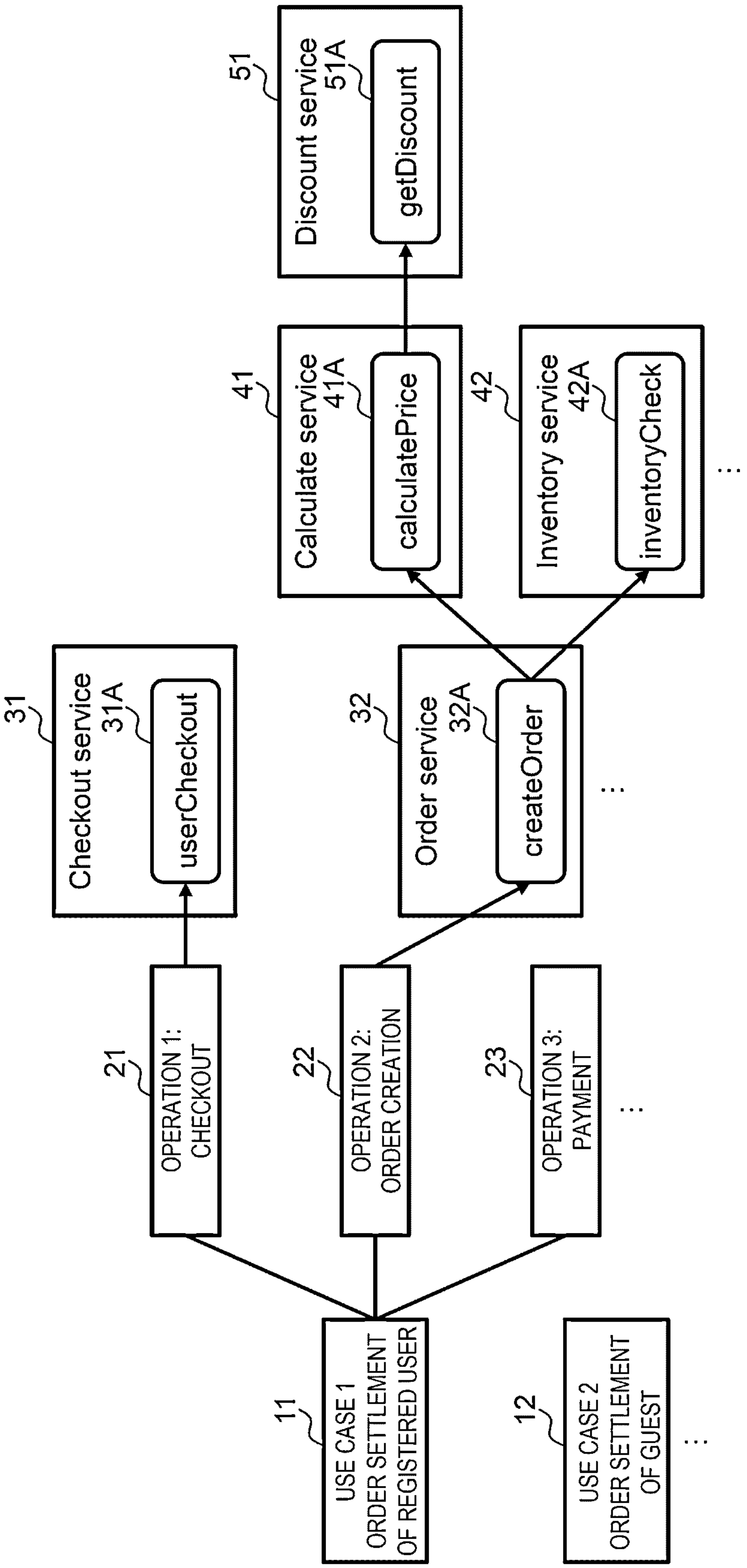
FIG. 2 is a configuration diagram showing a configuration example of monitored software managed by a monitored system according to the embodiment of the invention.

FIG. 2 is a configuration diagram showing a configuration example of monitored software managed by the monitored system according to the embodiment of the invention. In FIG. 2, the monitored system 1 includes, as the monitored software for executing the business of the IT system, use cases 11, 12, . . . , operation steps 21, 22, 23, . . . , microservices 31, 32, . . . , microservices 41, 42, . . . , microservice 51, and API endpoints 31A, 32A, 41A, 42A, and 51A. The use cases 11 and 12 are contents of the business to be implemented by the IT system. For example, the use case 11 indicates that a content of the business of the IT system is an order settlement of a registered user, and the use case 12 indicates that a content of the business of the IT system is an order settlement of a guest. The operation steps 21, 22, and 23 are components belonging to the use case 11, for example, and are components when the use case 11 is divided into a plurality of parts according to contents thereof. The operation step 21 is a step for operating order settlement processing of the registered user. The operation step 21 is, for example, checkout. The operation step 22 is a step for operating the order settlement processing of the registered user, and is, for example, order creation. The operation step 23 is a step for operating the order settlement processing of the registered user. The operation step 23 is, for example, payment.

The microservices 31, 32, 41, 42, and 51 are programs for providing service functions and are programs independent of one another. The microservice 31 is a program having a function of executing checkout processing. The microservice 32 is a program having a function of executing order creation processing. The microservice 41 is a program having a function of executing calculation processing. The microservice 42 is a program having a function of executing inventory check processing. The microservice 51 is a program having a function of executing coupon acquisition processing. The API endpoints 31A, 32A, 41A, 42A, and 51A are entry points for triggering execution of the functions of the microservices 31, 32, 41, 42, and 51. One use case includes a plurality of operation steps. One operation step is executed through one or more microservices and API endpoints.

That is, in order to execute processing of one operation step, the one operation step is connected via an input and output interface request (access) belonging to any of the microservices or the API endpoints. For example, the operation step 21 connected to the use case 11 is connected to the API endpoint 31A of the microservice 31. The operation step 22 connected to the use case 11 is connected to the endpoint 51A of the microservice 51 via the API endpoint 32A of the microservice 32 and the API endpoint 41A of the microservice 41, and is also connected to the API endpoint 32A of the microservice 32 and the API endpoint 42A of the microservice 42. At this time, each microservice and each API endpoint constitute an API request path indicating a transmission path of a request (access) from one of the microservices (client) to another microservice (server).

Figure 3:
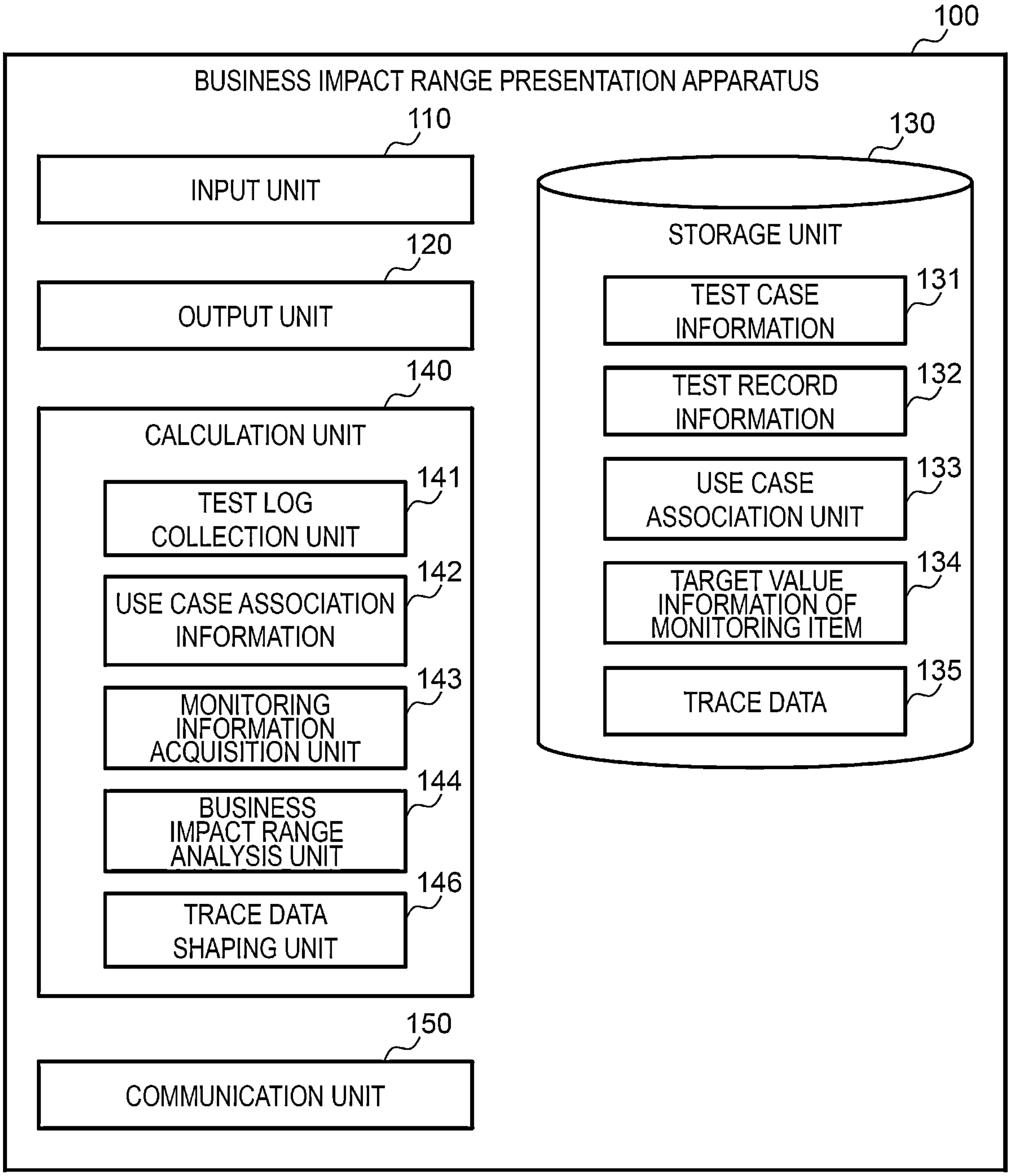
FIG. 3 is a functional block diagram showing a configuration example of the business impact range presentation apparatus according to the embodiment of the invention.

FIG. 3 is a functional block diagram showing a configuration example of the business impact range presentation apparatus 100 according to the embodiment of the invention. In FIG. 3, the business impact range presentation apparatus 100 includes, as software resources, an input unit 110, an output unit 120, a storage unit 130, a calculation unit 140, and a communication unit 150, for example. The business impact range presentation apparatus 100 includes, as a hardware resource, a computer (not shown) including a processor, a main storage apparatus, an auxiliary storage apparatus, an input apparatus, an output apparatus, and a communication apparatus.

The main storage apparatus is an apparatus that stores computer programs and data, and is, for example, a read only memory (ROM), a random access memory (RAM), or a non-volatile semiconductor memory.

The auxiliary storage apparatus is, for example, a hard disk drive, a solid state drive (SSD), an optical storage medium (that is, a compact disc (CD), a digital versatile disc (DVD), or the like), a storage system, a reading and writing apparatus of a recording medium such as an integrated circuit card (IC card) or a secure digital (SD) memory card, or a storage area of a cloud server. The computer programs and the data stored in the auxiliary storage apparatus are read into the main storage apparatus at any time.

Examples of the input apparatus include a keyboard, a mouse, a touch panel, a card reader, and a voice input device. The output apparatus (display apparatus) is a user interface that provides various types of information such as a processing progress and a processing result to a user. The output apparatus is, for example, a screen display apparatus serving as a display (that is, a liquid crystal monitor, a liquid crystal display (LCD), or a graphic card), a voice output apparatus (that is, a speaker), or a printing apparatus.

The communication apparatus is a wired or wireless communication interface that implements communication with another apparatus via a communication method such as a LAN or the Internet. The communication apparatus is, for example, a network interface card (NIC), a wireless communication module, a universal serial bus (USB) module, or a serial communication module.

Here, the processor is implemented using, for example, a CPU or an MPU. At this time, for example, the processor operates according to an input program loaded into the main storage apparatus, whereby a function of the input unit 110 is implemented, and a function of the output unit 120 is implemented by operating according to an output program loaded into the main storage apparatus. The processor operates according to a calculation program loaded into the main storage apparatus, whereby a function of the calculation unit 140 is implemented, and a function of the communication unit 150 is implemented by operating according to a communication program loaded into the main storage apparatus. Further, the processor operates the main storage apparatus as a target for storing data and information, whereby a function of the storage unit 130 is implemented.

Specifically, when the user operates a keyboard or a mouse, information is input via the input apparatus, the input unit 110 receives the information input thereto as input information, and outputs the input information to the calculation unit 140.

The output unit 120 generates screen information or the like to be displayed on a display (display unit) of the business impact range presentation apparatus 100 or the display apparatus 5, and outputs generated image information to the display or the display apparatus 5.

The storage unit 130 is a database that stores various types of information. The storage unit 130 stores test case information 131, test record information 132, use case association information 133, target value information 134 of a monitoring item, and trace data 135. The information stored in the storage unit 130 will be described later.

The calculation unit 140 includes, for example, a test log collection unit 141, a use case association unit 142, a monitoring information acquisition unit 143, a business impact range analysis unit 144, and a trace data shaping unit 146.

The test log collection unit 141 is a test log collection program that acquires, from the test apparatus 2, the test case information 131 and an execution result of a test, and acquires, from the monitoring apparatus 3, monitoring data collected when the test is executed. The test log collection unit 141 collects test record information indicating an execution result of a test on the monitored software in which one or more operation steps each indicating a component of each content of a plurality of businesses and a plurality of microservices executing processing by an operation of one or more operation steps are connected via one or more request paths, and collects test case information indicating a relationship between the content of each business and each operation step.

Specifically, the test log collection unit 141 reads and collects the test case information (see FIG. 4) to be described later from the test apparatus 2 through the network as test case information indicating a relationship between each use case and each test case (operation step), and stores the collected test case information in the storage unit 130. When the test apparatus 2 executes the test on the monitored system 1 and the monitoring apparatus 3 collects the monitoring data from the monitored system 1, the test log collection unit 141 reads, for example, the trace data 135, the target value information 134 of the monitoring item, a response time (processing time) of each request, and the like as the monitoring data from the monitoring apparatus 3, refers to the read monitoring data and the test case information 131 to generate the test record information (see FIG. 5) to be described later, and stores the generated test record information 132 in the storage unit 130.

Here, a method for acquiring the test case information 131 is not limited to the shown method. For example, the test case information 131 may be acquired from a continuous integration/continuous delivery (CI/CD) tool (for example, a tool such as Jenkins or CircleCI) that manages the test apparatus 2. In addition, a specific name and a specific test content may be acquired from another data source using a test case ID (for example, TC-1) and a use case ID (for example, UC-1) as a key. A method for acquiring the test log is not limited to the shown method. A method of acquiring a real time using an API of the monitoring apparatus 3 may be used.

The use case association unit 142 is a use case association program that patterns an API request based on the test record information generated by the test log collection unit 141 and extracts a relationship between the API request and the use case. The use case association unit 142 associates, based on the test record information 132 and the test case information collected by the test log collection unit 141, a request path corresponding to each operation step among one or more request paths with the content of each business to generate use case association information. Specifically, the use case association unit 142 acquires the execution result of the test (for example, the test record information) and the monitoring data (for example, the trace data), extracts, from the acquired information and data, a series of microservices, API endpoints, and request contents of the same operation (all API requests under the same TraceID), and generates nested structure information. At this time, the use case association unit 142 generates the nested structure information as the use case association information 133 shown in FIG. 6 and stores the generated use case association information 133 in the storage unit 130. That is, the use case association unit 142 associates a request path corresponding to each operation step among one or more request paths with each use case to generate the use case association information 133. Processing of extracting the relationship between the API request and the use case will be described later.

The monitoring information acquisition unit 143 is a monitoring information acquisition program that acquires, from the monitoring apparatus 3, the target value information 134 of the monitoring item and the monitoring data, for example, trace data indicating an execution result of each microservice as an execution result in a production environment for the monitored software managed by the monitored system 1. Specifically, the monitoring information acquisition unit 143 acquires, from a setting file of the monitoring apparatus 3, information related to a target value (measurement period, threshold, and percentage target) to be reached by a monitoring item of each monitored API, and acquires the trace data (URI, parameter, method, request body, status code, response body, start time, end time, TraceID, SpanID, and ParentID) belonging to the monitoring data of the monitoring apparatus 3. At this time, the monitoring information acquisition unit 143 stores, in the storage unit 130, information related to the target value to be reached by the monitoring item of each monitored API as the target value information of the monitoring item (see FIG. 7) to be described later, and stores the acquired trace data in the storage unit 130 as the trace data (see FIG. 8) to be described later.

The business impact range analysis unit 144 is a business impact range analysis program that determines, based on the trace data, whether an abnormality including performance degradation or failure occurrence occurs in any API request path among a plurality of API request paths, and compares the use case association information (see FIG. 6) to be described later with the trace data (see FIG. 8) to be described later to associate an API request path that does not reach the target value with the use case. Specifically, the business impact range analysis unit 144 compares the API request that does not reach the target value, for example, a feature of an API request whose processing time of the request exceeds "500 ms" with a pattern of an API request path recorded in the use case association information, and searches the use case association information for a use case in which there is an API request path that matches the API request that does not reach the target value.

The business impact range analysis unit 144 determines whether an abnormality occurs in any request path among one or more request paths based on the trace data acquired by the monitoring information acquisition unit 143.

The trace data shaping unit 146 is a monitoring information shaping program that excludes a redundant request path from the trace data 135 used in the search for the use case by the business impact range analysis unit 144. The trace data shaping unit 146 determines whether there is a redundant request path among the request paths during a normal operation, and creates, when there is a redundant request path, the trace data 135 excluding the redundant request path. Specifically, the trace data shaping unit 146 detects, in the trace data 135 acquired by the monitoring information acquisition unit 143, a redundant request path as compared with a normal request path, such as retransmission processing (retry) caused by error occurrence at the time of requesting from the client to the server, and excludes the redundant request path from the trace data. Details of processing for excluding the redundant request path will be described later.

When it is determined that an abnormality occurs in any of the request paths, the business impact range analysis unit 144 refers to the use case association information based on the any of the request paths excluding the redundant request path, and specifies a content of a business impacted by the request path where the abnormality occurs among contents of businesses.

The communication unit 150 is a communication program that transmits and receives information to and from an external apparatus. Specifically, the communication unit 150 acquires necessary data from the test apparatus 2 and the monitoring apparatus 3. The communication unit 150 transmits, to the display apparatus 5, an instruction to generate an information input user interface (UI) as screen information.

FIG. 4 is a configuration diagram showing a configuration example of the test case information 131 according to the embodiment of the invention. In FIG. 4, the test case information 131 is information generated in advance by the test apparatus 2 as information necessary for the test apparatus 2 to execute the test on the monitored system 1, and includes a test case ID 131A, a test case name 131B, a related use case ID, a related use case name 131D, and a test content 131E.

The test case ID 131A is an identifier for uniquely identifying the number of the test case. In the test case ID 131A, for example, information of "TC-1" is recorded as No. 1 of the test case. The test case name 131B is an identification name for identifying a name of the test case. In the test case name 131B, for example, when a test of checkout of the registered user (a test indicating a processing content of the operation step 21 in FIG. 2) is performed, "checkout of registered user" is recorded. The related use case ID is an identifier for uniquely identifying the number of the use case to be verified in the test case. For example, when the number of the use case to be verified in the test case (the order settlement of the registered user) is "UC-1", information of "UC-1" is recorded in the related use case ID. The related use case name 131D is a name for identifying the use case to be verified in the test case. In the related use case name 131D, for example, when the use case to be verified in the test case (TC-1) is the order settlement of the registered user (the use case 11 in FIG. 2), information of "order settlement of registered user" is recorded. The test content 131E is a content of the test by the test apparatus 2. The test content 131E records, as an operation on the monitored system 1 to be tested, an input, an expected behavior, and an output, information such as "Add plurality of items to cart. Check whether addition is successful.".

Here, for example, in the case of the test case (TC-1), the fact that "In the test case of the test case TC-1, the use case of the use case number UC-1 is verified. The test is completed if a plurality of items are added to a cart and a screen of addition success can be confirmed" is recorded.

FIG. 5 is a configuration diagram showing a configuration example of the test record: information 132 according to the embodiment of the invention. In FIG. 5, the test record information 132 is information in which a test result is collected and recorded when the test apparatus 2 executes the test on the monitored system 1. The test record information 132 includes a test case ID 132A, a uniform resource identifier (URI) 132B, a parameter 132C, a method 132D, a request body 132E, a status code 132F, a response body 132G, a start time 132H, an end time 132I, a TraceID 132J, a SpanID 132K, and a ParentID 132L.

Similarly to the test case ID 131A, the test case ID 132A is the number of the test case. The URI 132B is a path of a specified endpoint when the monitored system 1 executes the test. In the URI 132B, for example, information of "/userCheckout" is recorded as a path of an endpoint (API endpoint 31A) when the monitored system 1 executes the test according to the test case (TC-1). The parameter 132C is additional information added in a specific format at the end of a path specifying a transmission destination of a request (access) when the monitored system 1 executes the test. In the parameter 132C, for example, when the path of the endpoint (API endpoint 31A) is "/userCheckout?productID=ESPC7Z", information of "productID=ESPC7Z" is recorded.

The method 132D indicates a type of a request to the server (the transmission destination of the request) by the client (a transmission source of the request) of a communication protocol of hypertext transfer protocol (HTTP). In the method 132D, for example, information of "GET" is recorded as the request from the client to the server.

The request body 132E is information transmitted from the client to the server when requesting from the client to the API endpoint. If there is no information to be transmitted from the client to the server, such as when the method 132D is "GET", no information is recorded in the request body 132E.

The status code 132F is a status code of the communication protocol HTTP, that is, a code that is returned in response from the server to the client when the client issues the request to the API endpoint. In the status code 132F, for example, information of "200" is recorded, which is a status code indicating a normal HTTP response from the server to the client within.

The response body 132G is response information transmitted from the server to the client when requesting from the client to the API endpoint of the server. In the response body 132G, for example, information of "{"result": "0"}" transmitted from the server to the client as an endpoint call return value is recorded. When there is no information to be transmitted from the server to the client, no information is recorded in the response body 132G. In the embodiment, at least one of the status code 132F and the response body 132G may be used to determine whether there is a redundant request path as will be described later.

The start time 132H is a time when a specific request is transmitted from the client to the server. In the start time 132H, for example, when a start time is 01:42:08 on Nov. 4, 2022, information of "2022-11-04 01:42:08.5653016" is recorded.

The end time 132I is a time when the server completes processing and transmits a response to the client. In the end time 132I, when an end time is 01:42:09 on Nov. 4, 2022, information of "2022-11-04 01; 42:09.1837765" is recorded. At this time, a time from the start time 132H to the end time 132I is a processing time required for processing the request from the client. In the start time 132H and the end time 132I, a time may be recorded in an ms order as a time shorter than a second.

The TraceID 132J is an identifier for identifying a series of requests when requesting from the client to the API endpoint. In the TraceID 132J, for example, in the case of the test case (TC-1), information of "e8bdc860" is recorded as a request identifier when requesting from the client to the API endpoint 31A.

The SpanID 132K is an identifier for identifying a processing content of an endpoint when the request is transmitted from the client to the API endpoint. In the SpanID 132K, for example, information of "8b8d57f6" is recorded as an identifier for identifying processing of the API endpoint 31A when the request is transmitted from the client to the API endpoint 31A.

The ParentID 132L is an identifier for identifying processing of a previous request directly made from the client to the API endpoint among requests when the request is transmitted from the client to the API endpoint. For example, in the case of the test case (TC-1), no information is recorded in the ParentID 132L since there is no previous request among the requests when requesting from the client to the API endpoint 31A. In the case of the test case (TC-2), information of "91b8a50e" is recorded in a record in which "/calculatePrice" is recorded in the URI 132B in the ParentID 132L as an identifier for identifying processing of a previous request (an identifier for identifying processing of the API endpoint 32A).

Here, for example, in the case of the use case 11 indicating "order settlement of registered user", the processing of "checkout", which is an operation in the operation step 21 in the test case TC-1, is recorded as being executed using the API endpoint 31A of the microservice 31 indicating "Checkout service". In addition, the processing of "order creation", which is an operation in the operation step 22 in the test case TC-2, is recorded as being executed using the API endpoint 32A of the microservice 32 indicating "Order service", the API endpoint 41A of the microservice 41 indicating "Calculate service", the API endpoint 42A of the microservice 42 indicating "Inventory service", and the API endpoint 51A of the microservice 51 indicating "Discount service".

FIG. 6 is a configuration diagram showing a configuration example of the use case association information according to the embodiment of the invention. In FIG. 6, the use case association information 133 is information generated by the test apparatus 2 in order to associate the use case with the API request path. The use case association information 133 includes a use case ID 133A, an API request path 133B, and a request content 133C.

The use case ID 133A is an identification number for uniquely identifying the use case. In the use case ID 133A, for example, in the case of the use case 11 indicating "order settlement of registered user", information of "UC-1" is recorded. The API request path 133B is a path of a request transmitted from the client to the server when the use case is executed. In the API request path 133B, when the request is processed through one or more API endpoints, an order of microservices and API endpoints passed through and HTTP method information are recorded in, for example, a JavaScript (registered trademark) object notation (JSON) format. The request content 133C is a content of the request transmitted from the client to the server. In the request content 133C, a parameter of a first request or request body structure information is recorded in a JSON format on the API request path.

Here, for example, in a case where the use case ID 133A is "UC-1", it is indicated that a first operation related to the use case is "executing by calling a/userCheckout API endpoint of a Checkout microservice with a GET method and using productID as a parameter".

FIG. 7 is a configuration diagram showing a configuration example of the target value information of the monitoring item according to the embodiment of the invention. In FIG. 7, the target value information 134 of the monitoring item is information generated by the monitoring apparatus 3 as information including an availability target and a performance target to be accomplished by an API, and includes a target value ID 134A, an API endpoint 134B, a microservice 134C, a measurement period 134D, a threshold 134E, and a percentage target 134F.

The target value ID 134A is an identification number for identifying a target value and a measurement method of a monitoring index of the API to be monitored by the monitoring apparatus 3 (monitored API). In the target value ID 134A, for example, information of "SLO-1" is recorded as No. 1 of "service level objectives" (SLOs).

The API endpoint 134B is an API endpoint of the monitored API of the monitoring apparatus 3. In the API endpoint 134B, for example, in the case of the API endpoint 31A, information of "/userCheckout" is recorded.

The microservice 134C is a name of a microservice to which the monitored API belongs. In the microservice 134C, for example, when the microservice to which the monitored API belongs is the microservice 31, information of "Checkout" is recorded.

The measurement period 134D is a calculation period of the monitoring index (for example, the processing time required for processing the request) of the monitored API necessary for calculating the percentage target 134F. In the measurement period 134D, for example, when the calculation period is one month, information of "one month" is recorded.

The threshold 134E is a reference value for determining whether the monitoring index of the monitored API is normal or abnormal. For example, when the processing time required for processing the request is used as the monitoring index of the monitored API, information of "500 ms" is recorded in the threshold 134E. At this time, if the processing time required for processing the request is equal to or shorter than "500 ms", the monitoring index is determined to be normal, and if the processing time exceeds "500 ms", the monitoring index is determined to be abnormal.

The percentage target 134F is a target value indicating a ratio of a measurement value determined to be normal among all measurement values obtained during a certain period as measurement values of the monitored API. In the percentage target 134F, for example, when a target is that 99% of all the measurement values are normal, information of "99%" is recorded.

Here, for example, in the case where the target value ID 134A is "SLO-1", it is indicated that the target value is that "requests completed within 500 ms or shorter account for 99% or more among all requests received by the/userCheckout API endpoint of the Checkout microservice during a month".

FIG. 8 is a configuration diagram showing a configuration example of the trace data according to the embodiment of the invention. In FIG. 8, the trace data 135 includes data collected by the monitoring apparatus 3 from the monitored system 1 during an operation of the monitored system 1. The trace data 135 manages a URI 135A, a parameter 135B, a method 135C, a request body 135D, a status code 135E, a response body 135F, a start time 135G, an end time 135H, a TraceID 135I, a SpanID 135J, and a ParentID 135K.

The URI 135A is a path of a specified endpoint when the test case is executed. The URI 135A corresponds to the URI 132B in FIG. 5. The parameter 135B is additional information written in a specific format at the end of the path to specify the transmission destination of the request, and corresponds to the parameter 132C in FIG. 5.

The method 135C indicates a type of the request from the client to the server of the communication protocol HTTP. The method 135C corresponds to the method 132D in FIG. 5. The request body 135D is information transmitted from the client to the server. The request body 135D corresponds to the request body 132E in FIG. 5.

The status code 135E is a code returned to the client in the communication protocol HTTP when a response is made from the server. The status code 135E corresponds to the status code 132F in FIG. 5. As the status code 135E, for example, when the HTTP response from the server to the client is normal, information of "200" that is a status code indicating a normal response is recorded, whereas when the response is not normal, information other than "200" (for example, "400") is recorded as a status code indicating an abnormal response.

The response body 135F is response information transmitted from the server to the client. The response body 135F corresponds to the response body 132G in FIG. 5. In the response body 135F, for example, information of "{"result": "0"}" transmitted from the server to the client as an endpoint call return value is recorded.

The start time 135G is a time when a specific request is transmitted to the server. The start time 135G corresponds to the start time 132H in FIG. 5. Information of "2022-11-07 01:30:08.3226328" is recorded in the start time 135G of a first record.

The end time 135H is a time when the server completes processing and a response is transmitted from the server to the client. The end time 135H corresponds to the end time 132I in FIG. 5. Information of "2022-11-07 01:30: 08.8826696" is recorded in the end time 135H of the first record. A time from the start time 135G to the end time 135H is the processing time required for processing the request from the client (an operation step or a microserver). In the start time 135G and the end time 135H, a time may be recorded in an ms order as a time shorter than a second.

The TraceID 135I is an identifier for identifying a series of requests when requesting from the client to the API endpoint. The TraceID 135I corresponds to the TraceID 132J in FIG. 5. Information of "4kzkn1y" is recorded in the TraceID 135I of the first record.

The SpanID 135J is an identifier for identifying a processing content of an endpoint when the request is transmitted from the client to the API endpoint. The SpanID 135J corresponds to the SpanID 132K in FIG. 5. Information of "aj07npa" is recorded in the SpanID 135J of the first record.

The ParentID 135K is an identifier for identifying processing of a previous request directly made from the client to the API endpoint among requests when the request is transmitted from the client to the API endpoint. The ParentID 135K corresponds to the ParentID 132L in FIG. 5.

Here, for example, in the case of the first record, it is indicated that "An operation on the/userCheck API endpoint started from 2022-11-07 01:30:08.3226328 is executed by the GET method whose parameter is productID=ESPC7Z and ended at 2022-11-07 01:30:08.8826696. The Trace ID of the operation is 4kzk1y, and the SpanID is aj07npa".

Figure 9:
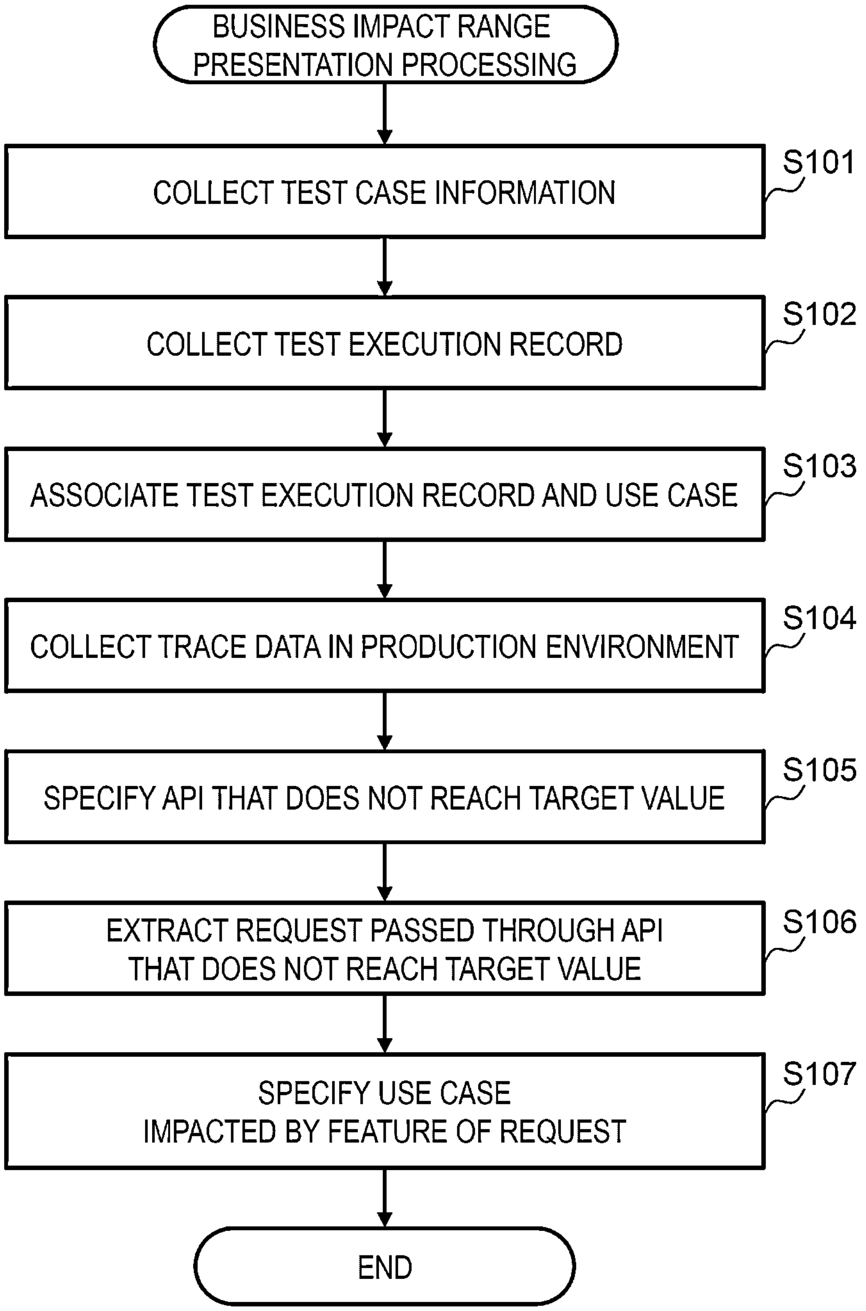
FIG. 9 is a flowchart showing an example of a procedure of business impact range presentation processing according to the embodiment of the invention.

FIG. 9 is a flowchart showing an example of a procedure of business impact range presentation processing according to the embodiment of the invention. The business impact range presentation processing is executed by the business impact range presentation apparatus 100, for example, when an execution instruction of the business impact range presentation processing is received from the display apparatus 5 via the input unit 110. Here, first, an overview of a business impact range presentation method using the business impact range presentation apparatus 100 will be described.

The business impact range presentation method includes: a test log collection step in which the test log collection unit 141 collects the test record information indicating the execution result of the test on the monitored software in which one or more operation steps each indicating a component of each content of a plurality of businesses and a plurality of microservices that execute processing by an operation of the one or more operation steps are connected via one or more request paths, and collects the test case information indicating a relationship between the content of each business and each operation step; a use case association step in which the use case association unit 142 generates the use case association information 133 by associating, based on the test record information 132 and the test case information collected in the test log collection step, a request path corresponding to each operation step among one or more request paths with the content of each business; a monitoring information acquisition step in which the monitoring information acquisition unit 143 acquires the trace data indicating an execution result of each of the microservices as an execution result in the production environment for the monitored software; a trace data shaping step in which the trace data shaping unit 146 determines whether a redundant request path exists among the request paths during a normal operation, and creates, when the redundant request path exists, the trace data 135 excluding the redundant request path; and a business impact range analysis step in which the business impact range analysis unit 144 determines, based on the trace data 135 acquired in the monitoring information acquisition step, whether an abnormality occurs in any request path among the one or more request paths. In the business impact range analysis step, when it is determined that the abnormality occurs in the any request path, the business impact range analysis unit 144 refers to the use case association information 133 based on the any request path excluding the redundant request path, and specifies a content of a business impacted by the request path where the abnormality occurs among the content of each business.

Next, the business impact range presentation processing will be specifically described. When processing of specifying an impact range is started by the business impact range presentation apparatus 100, the business impact range presentation apparatus 100 collects the test case information 131 from the test apparatus 2 (step S101). Specifically, in order to collect information defining the relationship between the test case and the use case, the test log collection unit 141 collects the test case information 131 from the test apparatus 2 and stores the collected test case information 131 in the storage unit 130. At this time, the test case information 131 records test contents for each of three test cases ("TC-1", "TC-2", and "TC-3") contained in the use case of "UC-1".

Next, the business impact range presentation apparatus 100 collects an execution record of the test executed on the monitored system 1 by the test apparatus 2 (step S102). Specifically, the test log collection unit 141 collects a record of the monitoring data (the trace data and the like) collected from the monitoring apparatus 3 during a test execution period to generate the test record information 132. At this time, in order to match a test execution content with the monitoring data (trace data) using a time (time stamp), the test log collection unit 141 includes test case information (test case ID) in the test record information 132 including the test log. For example, in the test record information 132, in the case of the test case of "TC-2", when a request is made to a/createOrder API endpoint of the Order service microservice, the request body includes "productID" and "userID", and a feature (API request path) indicating that the request is executed through a plurality of microservices and API endpoints is recorded.

Here, a method for matching the test case with the monitoring data (trace data) of the test execution result is not limited to the shown method. For example, the test case and the monitoring data (trace data) of the test execution result may be specified by a URI of a monitored API endpoint.

Next, the business impact range presentation apparatus 100 associates a test execution record recorded in the test record information 132 with the use case (step S103). Specifically, the use case association unit 142 groups, based on the information recorded in the test case information 131 and the information (test log) recorded in the test record information 132, all API requests related to the specific use case in units of TraceIDs, extracts a feature of a request group of each TraceID, and generates the use case association information 133. For example, based on an API request (TraceID: 55c94b0d) of the test case "TC-2" related to the use case "UC-1", the use case association unit 142 extracts an API request path (a path that completes processing from an API/createOrder of an order service through an API/calculatePrice of a calculate service, an API/getDiscount of a discount service, and/inventoryCheck of an inventory service) and a request content (with productID and userID in payload), and generates the use case association information 133 in a format shown in FIG. 6 from the extracted API request path and the extracted request content.

Here, a data item as a request feature and an extraction method are not limited to the shown method. For example, as long as the request can be uniquely identified, a feature other than the API request path and the request content may be adopted.

Next, the business impact range presentation apparatus 100 collects the monitoring data in the production environment from the monitoring apparatus 3 (step S104). Specifically, the monitoring information acquisition unit 143 collects monitoring data including features (URI, parameter, method, request body, status code, response body, start time, end time, TraceID, SpanID, and ParentID) of each API request from the monitoring apparatus 3, generates the trace data 135 in a format shown in FIG. 8, and stores the generated trace data 135 in the storage unit 130.

Next, the business impact range presentation apparatus 100 specifies an API that does not reach the target value (step S105). Specifically, the business impact range analysis unit 144 determines whether the API does not reach the target value in terms of a ratio of requests whose expected performance falls below a threshold during a certain period. For example, the business impact range analysis unit 144 monitors a behavior of the monitored system 1, and analyzes alert information or the monitoring data from the monitoring apparatus 3 when it is found that performance of the API "/calculatePrice" falls below the target value, thereby specifying "/calculatePrice".

Here, the method for specifying the API that does not reach the monitoring target value is not limited to the shown method. For example, depending on a nature of the monitored system 1, each development project may use its own criterion.

Next, the business impact range presentation apparatus 100 extracts a request passing through the API that does not reach the target value (step S106). Specifically, the business impact range analysis unit 144 extracts, based on the trace data, all requests that pass through the API endpoint that is an alert target, and specifies a request impacted in terms of the threshold of the target value information 134 of the monitoring item among all the extracted requests. For example, the trace data is searched for all requests that pass through the API endpoint whose URI is/calculatePrice. Among all the requests that pass through the API endpoint whose URI is/calculatePrice, a request whose processing time of/calculatePrice exceeds the threshold of 500 ms (the threshold 134E recorded in the target value information 134 of the monitoring item) is specified and recorded as an impacted request (a request whose processing time exceeds the threshold).

Next, the business impact range presentation apparatus 100 specifies the use case impacted by the feature of the request (API request) (step S107). Specifically, the business impact range analysis unit 144 compares the feature (trace data 135) of the API request with features (API request path 133B and request content 133C) of the API request recorded in the use case association information 133, and determines that the corresponding use case is "impacted" when contents of both are completely identical. For example, referring to the trace data 135 that is the feature of the API request, when the processing time of/calculatePrice exceeds the threshold of 500 ms based on a request record of the TraceID "ythy6f0" in the trace data 135, this request is regarded as an impacted request.

Here, the method for comparing the features of the API requests is not limited to the shown method. For example, a method of clustering using the feature of the API request and displaying in an order of distances may be adopted. In addition, there is a possibility that the impact range may be underestimated with a strict determination criterion, and thus a search method may be determined according to required detection accuracy.

In the API request specified by the TraceID "ythy6f0" in the trace data 135, an error occurs in a request recorded in a fourth record, and a retry operation of the request (a request recorded in a fifth record) occurs. When the feature of the API request in the trace data 135 and the feature of the API request recorded in the use case association information 133 are compared directly, a redundant request is contained in the trace data, and thus it is not possible to detect the use case that is supposed to match. In the present embodiment, before the comparison between the trace data and the use case association information, processing of detecting the redundant request relative to a normal request, such as a retry caused by error occurrence when requesting from the client to the server, and excluding the redundant request from the trace data (hereinafter referred to as "trace data shaping processing") is performed. The trace data shaping processing will be described in detail later.

Information of the use case impacted by the request specified in step S107 is transmitted to the display (display unit) of the business impact range presentation apparatus 100, and is transmitted to the display apparatus 5 via the communication unit 150. The display (display unit) displays the information of the use case impacted by the request specified as will be described later. Thereafter, the business impact range presentation apparatus 100 ends the processing in this routine.

Figure 10:
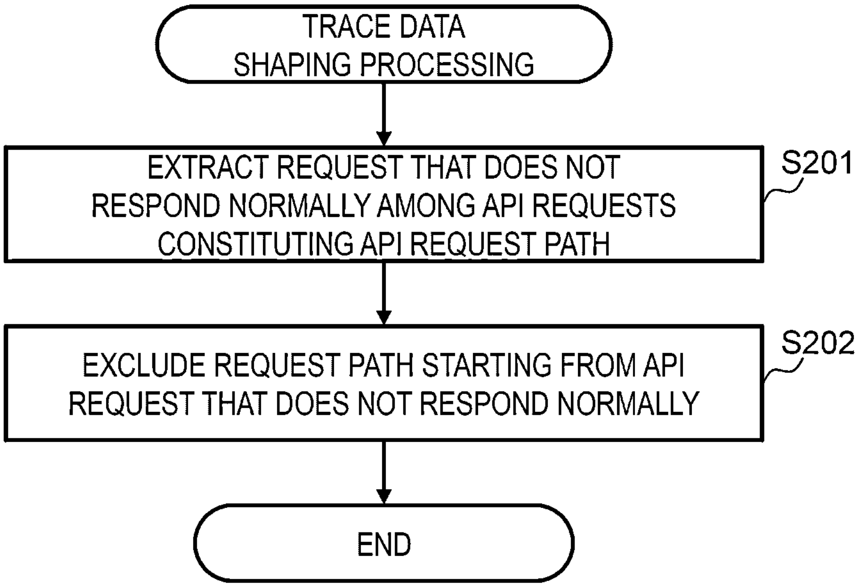
FIG. 10 is a flowchart showing an example of trace data shaping processing according to the embodiment of the invention.

FIG. 10 is a flowchart showing an example of a procedure of the trace data shaping processing. The trace data shaping processing is executed by the trace data shaping unit 146. As described above, the trace data shaping unit 146 determines whether there is a redundant request path among the request paths during a normal operation, and creates, when there is a redundant request path, the trace data 135 excluding the redundant request path. Hereinafter, details will be described.

First, the trace data shaping unit 146 extracts an API request that does not respond normally in the API request path recorded in the trace data 135 (step S201). Specifically, the trace data shaping unit 146 searches for and extracts an API request whose request result is an error among API requests recorded in the trace data 135.

Here, examples of a method for determining that the API request is an error may include (A) a method of determining an error when the status code 135E of an HTTP request recorded in the status code 135E in the trace data 135 is other than a normal value (code 200), and (B) a method of determining an error when the status code 135E is an error code specified by the monitored software.

As a method for determining that the API request is an error, there may also be (C) a method of determining based on a content of the response body 135F in the trace data 135. In this method, for example, there are two methods. First, in a first method, determination is based on a character string (word) in the response body 135F. For example, normal is determined if there is OK/True, whereas abnormal is determined if there is NO/ERROR/false. In a second method, the response body 135F is analyzed and determination is based on a value corresponding to a key such as result/code/status. For example, normal is determined if result="true"/code="OK"/status="OK". Abnormal is determined if result="false"/code="NG"/status="ERR".

Further, as a method for determining that the API request is an error, there may be (D) a method of regarding the status code 132F or the response body 132G of the API request recorded in the test record information 132 as information of a normal request and determining an error when corresponding information (the status code 135E and the response body 135F) of the API request in the trace data 135 does not match.

In addition, as a method for determining that the API request is an error, there may be (E) a method of extracting a feature of a normal request from information of the API request from past trace data and regarding an API request that does not match the feature as an error. For example, when a frequency of "result=0" of the response body 135F of the request is high in the past trace data 135 in a call from [API-A1] of a microservice A to [API-B1] of a microservice B, it is determined that the response body 135F of the normal request has a feature of "result=0".

As a method for determining that the API request is an error, there may also be (F) a method of extracting a pattern of the API request path from the past trace data 135 and comparing the extracted pattern with a similar path to exclude, as an error, an API request that does not match. For example, when paths of API requests that called in an order of API [A1] of microservice A→API [B1] of microservice B→API [C1] of microservice C, API [A1] of microservice A→API [B1] of microservice B→API [A1] of microservice A→API [B1] of microservice B→API [C1] of microservice C, and API [B1] of microservice B→API [C1] of microservice C do not exist in past API requests, and there are a large number of patterns called via a path of API [A1] of microservice A→API [B1] of microservice B→API [C1] of microservice C among similar (from [A1] of the microservice A to [B1] of the microservice B, from [B1] of the microservice B to [C1] of the microservice C) paths, a mismatched call (API [A1] of microservice A→API [B1] of microservice B→API [C1] of microservice C, API [A1] of microservice A→API [B1] of microservice B, and API [B1] of microservice B→API [C1] of microservice C) is determined as an error and excluded (to align with a past request pattern).

One or all of these methods are used to determine whether the API request recorded in the trace data 135 is an error, and when there is an error, the API request is extracted as an API request that does not respond normally. For example, in the trace data 135, according to the method (A), the API request recorded in the fourth record (a record in which the URI 135A is "/inventoryCheck") is extracted as the API request that does not respond normally since the status code 135E is not the code 200 indicating a normal response (but the code 400).

Next, the trace data shaping unit 146 excludes, from the trace data 135, the API request extracted as not responding normally (step S202). Specifically, paths of the API request extracted in step S201 and an API request further called from the API request are deleted from the record in the trace data 135. For example, in the trace data 135, the API request recorded in the fourth record (the record whose URI 135A is "/inventoryCheck") is extracted in step S201 as the API request that does not respond normally, and thus is deleted from the trace data 135. Here, since there is no API request to any other microservice from "/inventoryCheck" in the monitored software, that is, there is no record that records a SpanID "4jb2tnu" of "/inventoryCheck" in the ParentID 135K, processing is completed by deleting the record of "/inventoryCheck" from the trace data 135, and when there is an API request path to another microservice, a parent-child relationship of the API request is tracked from the SpanID 135J and the ParentID 135K, and all API requests in a path starting from the API request that does not respond normally are deleted from the trace data 135.

According to the above processing, it is possible to detect the request that is redundant with respect to a normal request, such as a retry caused by error occurrence at the time of requesting from the client to the server, and to exclude the redundant request from the trace data. In this way, when an abnormality occurs in a request path including a microservice in the production environment, a content of a business impacted by the abnormality of the request path can be specified more correctly.

Figure 11:
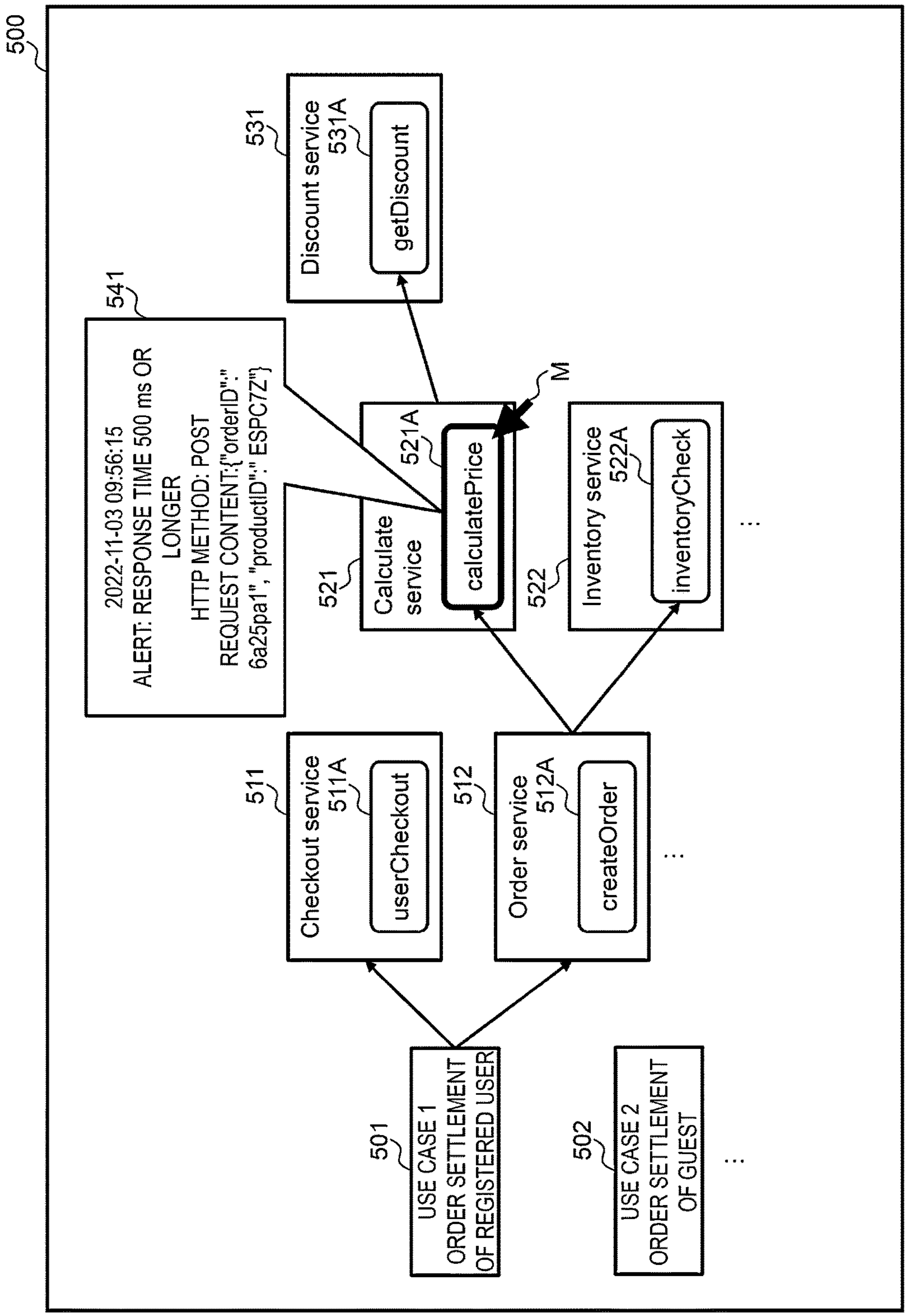
FIG. 11 is a configuration diagram showing an example of a display screen of a display apparatus according to the embodiment of the invention.

FIG. 11 is a configuration diagram showing an example of a display screen of the display apparatus according to the embodiment of the invention. In FIG. 11, a display screen 500 of the display apparatus 5 is a display screen starting from the use case. On the display screen 500, a plurality of use cases 501, 502, . . . are displayed. In each use case, a use case list is displayed. At this time, the use case 501 requiring attention is displayed in a highlighted manner. In an area adjacent to the use case 501, microservices 511, 512, . . . , 521, 522, . . . , 531 are displayed, and API endpoints 511A, 512A, . . . , 521A, 522A, . . . , 531A belonging to each microservice are displayed. The use case 501, the microservices 511 to 531, and the API endpoints 511A to 531A are displayed in a tree structure based on the use case association information 133.

Here, the display apparatus 5 or the display of the business impact range presentation apparatus 100 functions as a display unit that displays the component of the monitored software managed by the monitored system 1 and adjusts a displayed content based on an analysis result of the business impact range analysis unit 144. The display unit displays, in a highlighted manner, for example, the request path that does not reach the target value in the component of the monitored software and the use case impacted by the request path where the abnormality occurs. That is, the API endpoint 521A including an API that does not reach the target value is highlighted and displayed together with the use case 501.

An API request path including the use case 501, the microservice, and the API endpoint is displayed in a tree structure via arrows. A content of the API request is displayed as a tooltip on each API point. When the highlighted API endpoint 521A is clicked, related information 541 is displayed. As the related information 541, for example, an end time, an alert, an HTTP method, and a request content are displayed. The related information 541 can also indicate a monitoring threshold of the API, target value information, and trace data of a request related to a specific API. A content of image information displayed on the display screen 500 is provided as investigation information to an operation manager.

In the present embodiment, the display apparatus 5 displays the component of the monitored software including the redundant request path excluded as described above, for example. In this way, it is possible to visually recognize at which portion the redundant request path is located.

In the present embodiment, the display apparatus 5 displays the excluded redundant request path in a visually conspicuous manner, for example, highlighted manner. In this way, it is possible to more easily recognize at which portion the redundant request path is located.

Figure 12:
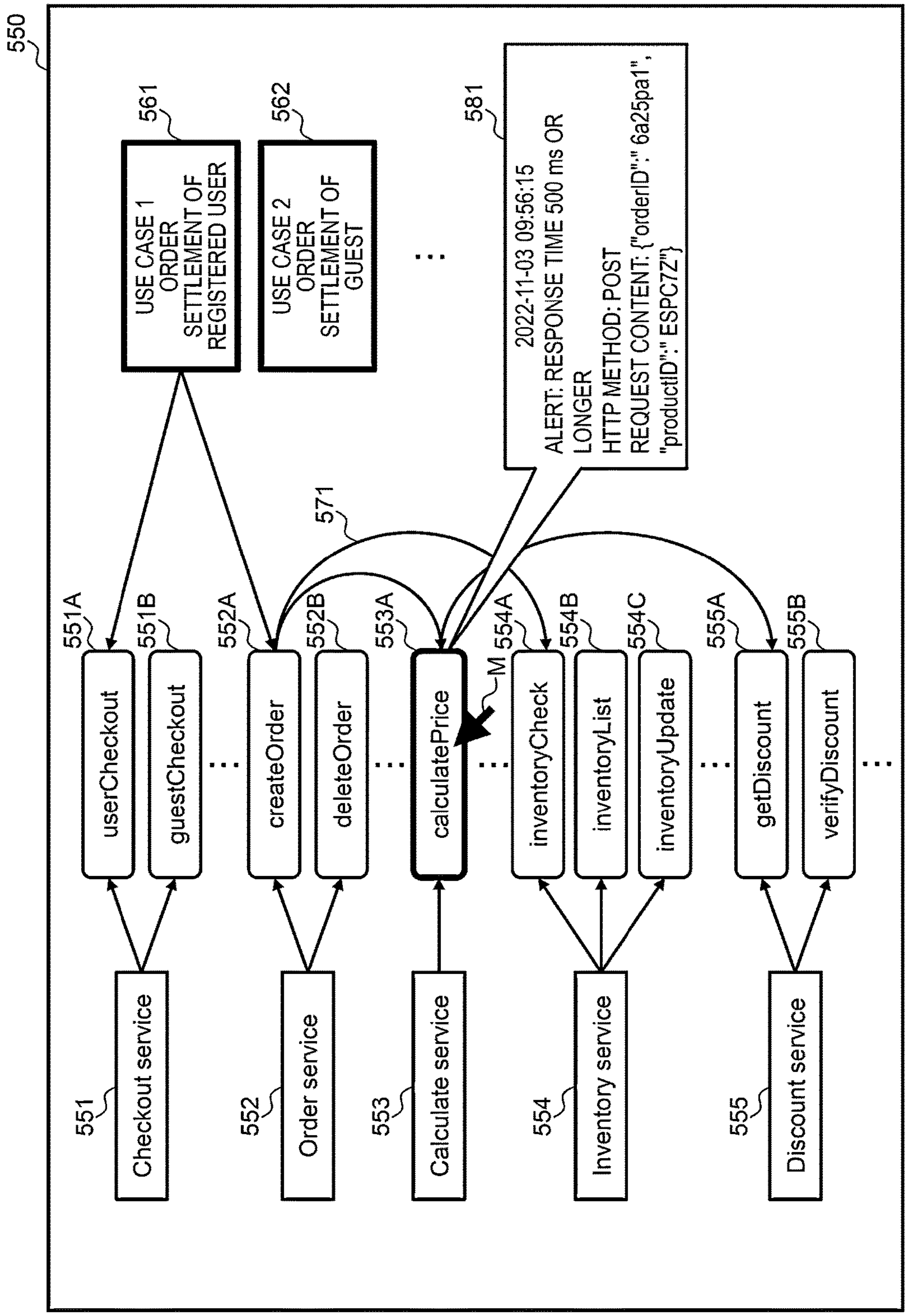
FIG. 12 is a configuration diagram showing an example of another display screen of the display apparatus according to the embodiment of the invention.

FIG. 12 is a configuration diagram showing an example of another display screen of the display apparatus according to the embodiment of the invention. In FIG. 12, a display screen 550 of the display apparatus 5 is a display screen starting from the microservice. A plurality of microservices 551, 552, 553, 554, and 555 are displayed on the display screen 550. In each of the microservices 551 to 555, a microservice list of the monitored system 1 is displayed. In an area adjacent to each of the microservices 551 to 555, a plurality of API endpoints 551A, 551B, . . . , 552A, 552B, . . . , 553A, . . . , 554A, 554B, 554C, . . . , 555A, 555B, . . . are displayed, and a plurality of use cases 561, 562, . . . are displayed. Each of the microservices 551 to 555 and each API endpoint are displayed in a tree structure based on the use case association information 133. An API request path related to the use case is displayed, for example, by an arrow 571 connecting the API endpoints.

The API endpoint 553A that does not reach the target value is displayed in a highlighted manner. The use case 561 impacted by the API endpoint 553A that does not reach the target value is also displayed in a highlighted manner. When the API endpoint 553A displayed in the highlighted manner is clicked, related information 581 is displayed. The related information 581 indicates, for example, an end time, an alert, an HTTP method, and a request content. The related information 581 can also indicate a monitoring threshold of the API, target value information, and trace data of a request related to a specific API. A content of image information displayed on the display screen 550 is provided as investigation information to an operation manager.

According to the present embodiment, when an abnormality occurs in an API request path including a microservice, a use case impacted by the abnormality in the API request path can be specified. According to the present embodiment, even when a release of the microservice is fast, the use case impacted by the abnormality of the API request path can be easily specified. Further, according to the present embodiment, it is possible to grasp a feature of an API request with high accuracy based on the test log (test record information), and to associate an API endpoint that does not reach the target value with the use case based on the grasped content. Accordingly, it is possible to take a proactive measure by visualizing the API endpoint that does not reach the target value related to an important use case. For example, when performance of the API endpoint associated with the use case degrades, the important use case can be operated normally by improving or optimizing the API endpoint. A measure for accomplishing a business goal can be proactively taken, which as a result contributes to improving contribution of the IT system to a business.

According to the present embodiment, when a retry operation accompanying an error occurs in an API request path in the production environment, a redundant API request path is reliably excluded from the trace data 135 as described above. Therefore, even when the API request path is extracted from trace data 135 in the production environment when the retry operation occurs, the trace data 135 is prevented from mistakenly mismatching with the test record information 132 that is supposed to be matched, and thus the use case corresponding to the API request path can be correctly extracted.

In the embodiment, the trace data 135 includes, as a processing time required for processing of each request by each operation step or each microservice, a processing time of the each request in each request path. The business impact range analysis unit 144 refers to the trace data 135 to compare the processing time of each request with a set threshold, and when a processing time of any request exceeds the threshold, the business impact range analysis unit 144 determines that an abnormality occurs and analyzes a request path of the request whose processing time exceeds the threshold as a request path where the abnormality occurs and a request path that does not reach the target value.

In the embodiment, the business impact range analysis unit 144 refers to the use case association information 133 based on the request path that does not reach the target value, and extracts, as request paths to be analyzed, all request paths including the request path that does not reach the target value from among one or more request paths.

In the embodiment, the business impact range analysis unit 144 determines whether the request path to be analyzed exists in the trace data, analyzes, when it is determined that the request path to be analyzed does not exist in the trace data 135, a content of a business related to a microservice connected to the request path to be analyzed among contents of businesses as a content of a business possibly impacted by the request path to be analyzed, and analyzes, when it is determined that the request path to be analyzed exists in the trace data 135, the content of the business related to the microservice connected to the request path to be analyzed among the contents of the businesses as a content of a business impacted by the request path to be analyzed.

The business impact range presentation apparatus 100 according to the embodiment further includes the display unit configured to display the component of the monitored software and adjust the displayed content based on the analysis result of the business impact range analysis unit 144. The display unit displays, in a highlighted manner, the request path that does not reach the target value in the component of the monitored software and the content of the business impacted by the request path where the abnormality occurs.

The business impact range presentation apparatus 100 according to the embodiment further includes the display unit configured to display the component of the monitored software and adjust the displayed content based on the analysis result of the business impact range analysis unit. The display unit displays, in a highlighted manner, the content of the business possibly impacted by the request path to be analyzed in the component of the monitored software and the content of the business impacted by the request path to be analyzed.

The invention is not limited to the above-described embodiment, and includes various modifications and equivalent configurations within the scope of the appended claims. For example, the above-described embodiment has been described in detail to facilitate understanding of the invention, and the invention is not limited to those including all the above-described configurations. At least one of the elements described as being connected in parallel in the present embodiment may be connected in series to another element.

The invention can be applied to, for example, a business impact range presentation apparatus related to a technique for presenting a range of an impact on a business.

What is claimed is:

1. A business impact range presentation apparatus comprising:

a test log collection unit configured to collect test record information indicating an execution result of a test on monitored software in which one or more operation steps each indicating a component of each content of a plurality of businesses and a plurality of microservices that execute processing by an operation of the one or more operation steps are connected via one or more request paths, and to collect test case information indicating a relationship between the content of each of the businesses and each of the operation steps;

a use case association unit configured to generate use case association information by associating, based on the test record information and the test case information collected by the test log collection unit, a request path corresponding to each of the operation steps among the one or more request paths with the content of each of the businesses;

a monitoring information acquisition unit configured to acquire trace data indicating an execution result of each of the microservices as an execution result in a production environment for the monitored software;

a trace data shaping unit configured to determine whether a redundant request path exists among the request paths during a normal operation, and to create, when the redundant request path exists, the trace data excluding the redundant request path; and a business impact range analysis unit configured to determine, based on the trace data acquired by the monitoring information acquisition unit, whether an abnormality occurs in any request path among the one or more request paths, wherein when it is determined that the abnormality occurs in the any request path, the business impact range analysis unit refers to the use case association information based on the any request path excluding the redundant request path, and specifies a content of a business impacted by the request path where the abnormality occurs among the content of each of the businesses, wherein the trace data includes, as a processing time required for processing of each request by each of the operation steps or each of the microservices, a processing time of the each request in each of the request paths, and the business impact range analysis unit refers to the trace data to compare the processing time of the each request with a set threshold, and when a processing time of any request exceeds the threshold, the business impact range analysis unit determines that the abnormality occurs and analyzes a request path of the request whose processing time exceeds the threshold as a request path where the abnormality occurs and a request path that does not reach a target value, wherein the business impact range analysis unit refers to the use case association information based on the request path that does not reach the target value, and extracts, each as a request path to be analyzed, all request paths including the request path that does not reach the target value from among the one or more request paths, and wherein the business impact range analysis unit determines whether the request path to be analyzed exists in the trace data, analyzes, when it is determined that the request path to be analyzed does not exist in the trace data, a content of a business related to each of the microservices connected to the request path to be analyzed among the content of each of the businesses as a content of a business possibly impacted by the request path to be analyzed, and analyzes, when it is determined that the request path to be analyzed exists in the trace data, the content of the business related to each of the microservices connected to the request path to be analyzed among the content of each of the businesses as a content of a business impacted by the request path to be analyzed, and wherein the business impact range analysis unit is configured to perform said referring based on the trace data from which the redundant request path has been excluded, such that the content of the business corresponding to the request path where the abnormality occurs is correctly detected without mismatch caused by redundant retry paths.

2. The business impact range presentation apparatus according to claim 1, further comprising:

a display unit configured to display a component of the monitored software and to adjust a displayed content based on an analysis result of the business impact range analysis unit, wherein the display unit displays the component of the monitored software including the excluded redundant request path.

3. The business impact range presentation apparatus according to claim 1, further comprising:

a display unit configured to display a component of the monitored software and to adjust a displayed content based on an analysis result of the business impact range analysis unit, wherein the display unit displays, in a highlighted manner, the request path that does not reach the target value in the component of the monitored software and the content of the business impacted by the request path where the abnormality occurs.

4. The business impact range presentation apparatus according to claim 1, further comprising:

a display unit configured to display a component of the monitored software and to adjust a displayed content based on an analysis result of the business impact range analysis unit, wherein the display unit displays, in a highlighted manner, the content of the business possibly impacted by the request path to be analyzed in the component of the monitored software and the content of the business impacted by the request path to be analyzed.

5. A business impact range presentation method comprising:

a test log collection step in which a test log collection unit collects test record information indicating an execution result of a test on monitored software in which one or more operation steps each indicating a component of each content of a plurality of businesses and a plurality of microservices that execute processing by an operation of the one or more operation steps are connected via one or more request paths, and collects test case information indicating a relationship between the content of each of the businesses and each of the operation steps;

a use case association step in which a use case association unit generates use case association information by associating, based on the test record information and the test case information collected in the test log collection step, a request path corresponding to each of the operation steps among the one or more request paths with the content of each of the businesses;

a monitoring information acquisition step in which a monitoring information acquisition unit acquires trace data indicating an execution result of each of the microservices as an execution result in a production environment for the monitored software;

a trace data shaping step in which a trace data shaping unit determines whether a redundant request path exists among the request paths during a normal operation, and creates, when the redundant request path exists, the trace data excluding the redundant request path; and a business impact range analysis step in which a business impact range analysis unit determines, based on the trace data acquired in the monitoring information acquisition step, whether an abnormality occurs in any request path among the one or more request paths, wherein in the business impact range analysis step, when it is determined that the abnormality occurs in the any request path, the business impact range analysis unit refers to the use case association information based on the any request path excluding the redundant request path, and specifies a content of a business impacted by the request path where the abnormality occurs among the content of each of the businesses, wherein the trace data includes, as a processing time required for processing of each request by each of the operation steps or each of the microservices, a processing time of the each request in each of the request paths, and in the business impact range analysis step, the business impact range analysis unit refers to the trace data to compare the processing time of the each request with a set threshold, and when a processing time of any request exceeds the threshold, the business impact range analysis unit determines that the abnormality occurs and analyzes a request path of the request whose processing time exceeds the threshold as a request path where the abnormality occurs and a request path that does not reach a target value, wherein in the business impact range analysis step, the business impact range analysis unit refers to the use case association information based on the request path that does not reach the target value, and extracts, each as a request path to be analyzed, all request paths including the request path that does not reach the target value from among the one or more request paths, and wherein in the business impact range analysis step, the business impact range analysis unit determines whether the request path to be analyzed exists in the trace data, analyzes, when it is determined that the request path to be analyzed does not exist in the trace data, a content of a business related to each of the microservices connected to the request path to be analyzed among the content of each of the businesses as a content of a business possibly impacted by the request path to be analyzed, and analyzes, when it is determined that the request path to be analyzed exists in the trace data, the content of the business related to each of the microservices connected to the request path to be analyzed among the content of each of the businesses as a content of a business impacted by the request path to be analyzed, and wherein the business impact range analysis unit is configured to perform said referring based on the trace data from which the redundant request path has been excluded, such that the content of the business corresponding to the request path where the abnormality occurs is correctly detected without mismatch caused by redundant retry paths.

6. The business impact range presentation method according to claim 5, wherein a display unit that displays a component of the monitored software and adjusts a displayed content based on an analysis result of the business impact range analysis unit displays the component of the monitored software including the excluded redundant request path.

7. The business impact range presentation method according to claim 5, wherein a display unit that displays a component of the monitored software and adjusts a displayed content based on an analysis result of the business impact range analysis unit displays, in a highlighted manner, the request path that does not reach the target value in the component of the monitored software and the content of the business impacted by the request path where the abnormality occurs.

8. The business impact range presentation method according to claim 5, wherein a display unit that displays a component of the monitored software and adjusts a displayed content based on an analysis result of the business impact range analysis unit displays, in a highlighted manner, the content of the business possibly impacted by the request path to be analyzed in the component of the monitored software and the content of the business impacted by the request path to be analyzed.

* * * * *